(12) United States Patent
Beisele et al.

(10) Patent No.: US 8,999,433 B2
(45) Date of Patent: Apr. 7, 2015

(54) DIRECT OVERMOLDING

(75) Inventors: Christian Beisele, Müllheim (DE); Josef Grindling, Aesch (CH); Daniel Baer, Riehen (CH)

(73) Assignee: Huntsman International LLC, The Woodlands, TX (US)

( * ) Notice: Subject to any disclaimer, the term of this patent is extended or adjusted under 35 U.S.C. 154(b) by 102 days.

(21) Appl. No.: 13/260,736

(22) PCT Filed: Feb. 24, 2010

(86) PCT No.: PCT/EP2010/052317
§ 371 (c)(1),
(2), (4) Date: Sep. 28, 2011

(87) PCT Pub. No.: WO2010/112272
PCT Pub. Date: Oct. 7, 2010

(65) Prior Publication Data
US 2012/0022184 A1   Jan. 26, 2012

(30) Foreign Application Priority Data
Apr. 2, 2009 (EP) .................... 09157142

(51) Int. Cl.
| B05D 3/02 | (2006.01) |
| C08L 63/00 | (2006.01) |
| C08K 3/34 | (2006.01) |
| C08K 3/36 | (2006.01) |
| H01B 3/40 | (2006.01) |
| H01H 33/662 | (2006.01) |

(52) U.S. Cl.
CPC ... C08K 3/34 (2013.01); C08K 3/36 (2013.01); H01B 3/40 (2013.01)

(58) Field of Classification Search
None
See application file for complete search history.

(56) References Cited

U.S. PATENT DOCUMENTS

| 4,287,115 A | * | 9/1981 | Legler | 523/443 |
| 4,632,798 A | * | 12/1986 | Eickman et al. | 264/272.17 |
| 5,370,921 A | * | 12/1994 | Cedarleaf | 428/138 |
| 6,638,567 B1 | | 10/2003 | Beisele | |
| 2001/0002666 A1 | * | 6/2001 | Ito et al. | 218/134 |
| 2003/0153650 A1 | * | 8/2003 | Tada et al. | 523/400 |
| 2005/0065294 A1 | * | 3/2005 | Cramer et al. | 525/476 |
| 2011/0184092 A1 | * | 7/2011 | Schaal et al. | 523/466 |
| 2012/0208924 A1 | * | 8/2012 | Singh et al. | 523/400 |

FOREIGN PATENT DOCUMENTS

| EP | 0633286 | | 1/1995 | | |
| EP | 1 176 171 | | 1/2002 | | |
| JP | 55118952 A | * | 9/1980 | | C08L 63/00 |
| JP | 2003068174 A | * | 3/2003 | | H01H 33/66 |
| JP | 2005108956 A | * | 4/2005 | | H01C 1/142 |
| JP | 2008189827 A | * | 8/2008 | | C08L 63/06 |
| WO | 98/32138 | | 7/1998 | | |
| WO | 2004/090913 | | 10/2004 | | |
| WO | WO 2010031445 A1 | * | 3/2010 | | C08G 59/22 |
| WO | WO 2011006530 A1 | * | 1/2011 | | C08G 59/42 |

OTHER PUBLICATIONS

Machine translation of JP 2003068174 A, provided by the JPO website (no date).*
JPO abstract of JP 55118952 A (no date).*
Derwent abstract of JP 55118952 A (no date).*
Product Data Sheet for Nyad G Wollastonite, provided by NYCO (no date).*
Translation of JP 55-118952 A, provided by USPTO translations (no date).*
Technical data sheet for Silquest A-186 (no date).*
International Search Report regarding corresponding application No. PCT/EP2010/052317, dated May 6, 2010.

* cited by examiner

Primary Examiner — Michael J Feely

(57) ABSTRACT

Disclosed is a curable composition comprising an epoxy resin and a filler composition, a cured product obtained by curing said curable composition as well as the use of the cured products as electrically insulating construction material for electrical or electronic components.

9 Claims, No Drawings

DIRECT OVERMOLDING

CROSS REFERENCE TO RELATED APPLICATIONS

This application is the National Phase of International Application PCT/EP2010/052317 filed Feb. 24, 2010 which designated the U.S. and which claims priority to patent application (EP) 09157142.2 filed Apr. 2, 2009. The noted applications are incorporated herein by reference.

FIELD OF THE INVENTION

The present invention relates to a curable composition comprising an epoxy resin and a filler composition, a cured product obtained by curing said curable composition as well as the use of the cured products as electrically insulating construction material for electrical or electronic components. Further, the present invention relates to the use of a curable composition for the manufacture of components or parts of electrical equipment as well as a method for the manufacturing of an electrical insulation equipment.

BACKGROUND OF THE INVENTION

Components of switching devices are subject to very stringent requirements. In general the electrical components are provided with a sheathing which consists of an electrically insulating synthetic resin. In addition to the required dielectric characteristics of the sheathing, mechanical characteristics such as impact resistance and the inclination to form cracks are of importance.

A critical factor for a sheathing resin for high performance electrical components such as vacuum switch gears or transformers working in a voltage range up to about 40 kV is the resistance against crack formation during temperature variation.

An indication for the thermal cycle crack resistance is the so-called crack index value (RI).

In order to avoid cracks in the sheathing material the prior art proposes that the vacuum chambers of switch gears and other parts are installed in the dielectric moldings and are encapsulated into the load-bearing enclosure composed of an epoxy resin. In order to prevent crack formation the molding composition contains filling powder such as quartz powder or synthetic silica powder.

However, the crack index value (RI) achieved by this method is not sufficient for high performance electrical components.

Furthermore, electrical components have been encapsulated in silicone or polyurethane or a "soft" casting resin to have a kind of buffer that withstands the stresses due to mismatch of thermal expansions.

The encapsulation technique means that the vacuum switching chamber and the inserted parts must be cushioned, for mechanical reasons, by means of an elastomer material before the introduction into the epoxy resin. The requirements for this material are:
high dielectric strength and adequate elasticity to absorb thermal stresses and mechanical stresses.

The elastomeric cushioning absorbs stresses which occur in the encapsulated components during the operation due to a mismatch of different thermal expansions of the encapsulating material and the component to be encapsulated.

However, this technology requires at least two process steps which is less economic and, furthermore, time consuming.

Thus, a molding process is preferred wherein the epoxy resin is directly applied to the vacuum chamber of a switch gear and which does not require an additional cushioning.

WO-A1-2004/090913 describes a method for the production of moldings for switching devices for low-voltage, medium-voltage and high-voltage applications wherein a mixture of glass balls with a predetermined distribution of diameters of size Dx is introduced into the encapsulation compound thus creating direct encapsulation of components. However, the method for the direct overmolding of switching devices disclosed in WO-A1-2004/090913 suffers from high costs of the hollow spheres and, furthermore, the hollow spheres may be partly mechanically destroyed during the mixing process which reduces the efficiency.

Further, it is disclosed that additional fillers such as amorphous silica and wollastonite may be used. However, the application does not teach that a certain combination of these two fillers would be suitable as filler for epoxy systems to be used for direct overmolding of vacuum switch gears.

EP-A2-1 176 171 discloses a dielectric material for direct overmolding of switch gears comprising a heat curable matrix resin containing epoxy resin and modified acid anhydride as well as inorganic particles and rubber particles having a core/shell structure. However, the combination of inorganic particles together with rubber particles having a core/shell structure is very expensive.

U.S. Pat. No. 6,638,567 B1 discloses a curable composition comprising:
(a) a cycloaliphatic epoxy resin that is liquid at room temperature and, suspended therein, a core/shell polymer;
(b) a polycarboxylic anhydride; and
(c) two different fillers, (c1) and (c2), wherein (c1) is a filler that is able to release water as the temperature rises above room temperature; (c2) is a reinforcing material; the total proportion of fillers (c1) and (c2) is from 58 to 73% by weight based on the total amount of components (a), (b), (c1) and (c2) in the composition; and the ratio by weight of the fillers (c1):(c2) is in the range from 1:3 to 1:1. The curable composition can be used for the direct overmolding of vacuum switch gears and other high performance electrical components. However, core-shell polymer toughened systems are very expensive.

SUMMARY OF THE INVENTION

It was an object of the present invention to overcome the problems associated with the systems disclosed in the prior art. Further, it was an object to provide a curable composition which can be directly applied to a ceramic housing of a switch gear and which is highly resistant to cracks upon temperature changes of the ceramic housing.

It has now surprisingly found that the above-mentioned problems can be solved by a curable epoxy resin composition comprising a specific combination of different fillers.

DETAILED DESCRIPTION OF THE INVENTION

The first embodiment of the present invention is a curable composition comprising
a) an epoxy resin and
b) a filler composition comprising
  i) wollastonite and
  ii) amorphous silica.

An essential component of the curable composition according to the present invention is a filler composition comprising wollastonite and amorphous silica.

Wollastonite is a naturally occurring acicular calcium silicate of the formula $Ca_3[Si_3O_9]$ having particle sizes in the micron range. Artificially produced wollastonite is also acicular. Wollastonite is commercially available, for example under the name Nyad® from the Nyco Company or under the name Tremin® from Quarzwerke, Germany, e.g., Tremin® 283-100 EST or Tremin® 283-600 EST.

According to a preferred embodiment the wollastonite is a powder preferably having an average particle size $d_{50}$ of 1 to 100 µm, more preferably from 2 to 50 µm and most preferably from 3 to 25 µm determined according to ISO 13320-1:1999.

Further preferred is a curable composition wherein the wollastonite has a particle size $d_{95}$ of 1 to 200 µm, more preferably from 2 to 100 µm and most preferably from 5 to 90 µm determined according to ISO 13320-1:1999.

$D_{50}$ is known as the medium value of particle diameter. This means that a powder comprises 50% of particles having a larger particle size and 50% of particles having a smaller particle size than the $d_{50}$ value. $D_{95}$ means that 95% of the particles have a smaller particle size and 5% of the particles have a larger particle size than the $d_{95}$ value.

The wollastonite preferably has a bulk density of 0.40 to 0.90 g/cm$^3$, more preferably from 0.49 to 0.80 g/cm$^3$ and most preferably from 0.55 to 0.76 g/cm$^3$ determined according to DIN 52466.

Especially preferred is wollastonite having a specific surface BET of 2 to 5 m$^2$/g determined according to DIN 66132.

The curable composition according to the present invention preferably comprises wollastonite which is surface treated. Preferably, the wollastonite is surface treated with a silane, preferably selected from the group consisting of aminosilane, epoxysilane, (meth)acrylic silane, methylsilane and vinylsilane.

Preferably the silane is selected from a silane according to the following formula:

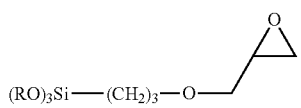

R=methyl or ethyl

The second essential filler component is amorphous silica. Preferably the amorphous silica is natural amorphous silica or fused silica. Fused silica with an average particle size ($d_{50}$) of 10.5 µm is commercially available under the name Tecosil® from CE Minerals, Greenville, Tenn., USA. Natural amorphous silica is available under the name Amosil® from Quarzwerke, Germany.

According to a preferred embodiment the amorphous silica has an average particle size ($d_{50}$) of 1 to 100 µm, more preferably from 2 to 50 µm and most preferably from 5 to 25 µm determined according to ISO 13320-1:1999.

Preferably, the amorphous silica is surface treated. Preferably, the amorphous silica is surface treated with a silane, more preferably selected from the group consisting of amino silane, epoxy silane, (meth)acrylic silane, methyl silane and vinyl silane.

Preferably the silane is selected from a silane according to the following formula:

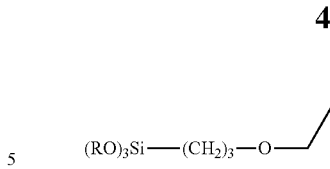

R=methyl or ethyl

According to a preferred embodiment the curable composition according to the present invention comprises the filler composition wherein the weight ratio of amorphous silica to wollastonite is 10:1 to 1:10, preferably 9:1 to 1:9, more preferably 85:15 to 15:85, especially preferred from 70:30 to 30:70 and most preferred from 60:40 to 40:60.

Preferably, the curable composition comprises a filler composition wherein the wollastonite and/or the amorphous silica has an average particle size ($d_{50}$) ranging from 2 to 50 µm determined according to ISO 13320-1:1999.

Further, it is preferred that at least one of the fillers of the filler composition is surface treated with a silane.

Especially preferred is a curable composition wherein the wollastonite and/or the amorphous silica is surface treated with a silane selected from the group consisting of aminosilane, epoxysilane, (meth)acrylic silane, methylsilane and vinylsilane.

A further essential component of the curable composition according to the present invention is the epoxy resin.

Preferably, the epoxy resin is liquid at 25° C.

For the preparation of the compositions according to the invention, epoxy resins suitable as component (a) are those customary in epoxy resin technology. Examples of epoxy resins are:

I) Polyglycidyl and poly(β-methylglycidyl) esters, obtainable by reaction of a compound having at least two carboxyl groups in the molecule with epichlorohydrin and β-methylepichlorohydrin, respectively. The reaction is advantageously performed in the presence of bases.

Aliphatic polycarboxylic acids may be used as the compound having at least two carboxyl groups in the molecule. Examples of such polycarboxylic acids are oxalic acid, succinic acid, glutaric acid, adipic acid, pimelic acid, suberic acid, azelaic acid or dimerised or trimerised linoleic acid.

It is also possible, however, to use cycloaliphatic polycarboxylic acids, for example hexahydrophthalic acid or 4-methylhexahydrophthalic acid.

Aromatic polycarboxylic acids, for example phthalic acid, isophthalic acid or terephthalic acid, may also be used as well as partly hydrogenated aromatic polycarboxylic acids such as tetrahydrophthalic acid or 4-methyltetrahydrophthalic acid.

II) Polyglycidyl or poly(β-methylglycidyl) ethers, obtainable by reaction of a compound having at least two free alcoholic hydroxy groups and/or phenolic hydroxy groups with epichlorohydrin or β-methylepichlorohydrin under alkaline conditions or in the presence of an acid catalyst with subsequent alkali treatment.

The glycidyl ethers of this kind are derived, for example, from acyclic alcohols, e.g. from ethylene glycol, diethylene glycol or higher poly(oxyethylene) glycols, propane-1,2-dial or poly(oxypropylene) glycols, propane-1,3-diol, butane-1, 4-diol, poly(oxytetramethylene) glycols, pentane-1,5-diol, hexane-1,6-diol, hexane-2,4,6-triol, glycerol, 1,1,1-trimethylol-propane, pentaerythritol, sorbitol, and also from polyepichlorohydrins.

Further glycidyl ethers of this kind are derived from cycloaliphatic alcohols, such as 1,4-cyclohexanedimethanol, bis(4-hydroxycyclohexyl) methane or 2,2-bis(4-hydroxycyclohexyl)propane, or from alcohols that contain aromatic groups and/or further functional groups, such as N,N-bis(2-hydroxyethyl)aniline or p,p'-bis(2-hydroxyethylamino)diphenylmethane. The glycidyl ethers can also be based on mononuclear phenols, for example resorcinol or hydroquinone, or on polynuclear phenols, for example bis(4-hydroxyphenyl)methane, 4,4'-dihydroxybiphenyl, bis(4-hydroxyphenyl)sulfone, 1,1,2,2-tetrakis(4-hydroxyphenyl)ethane, 2,2-bis(4-hydroxyphenyl)propane or 2,2-bis(3,5-dibromo-4-hydroxyphenyl) propane.

Further hydroxy compounds that are suitable for the preparation of glycidyl ethers are novolaks, obtainable by condensation of aldehydes, such as formaldehyde, acetaldehyde, chloral or furfuraldehyde, with phenols or bisphenols that are unsubstituted or substituted by chlorine atoms or by $C_1$-$C_9$alkyl groups, e.g. phenol, 4-chlorophenol, 2-methylphenol or 4-tert-butylphenol.

III) Poly(N-glycidyl) compounds, obtainable by dehydrochlorination of the reaction products of epichlorohydrin with amines containing at least two amine hydrogen atoms. Such amines are, for example, aniline, n-butylamine, bis(4-aminophenyl)methane, m-xylylenediamine or bis(4-methylaminophenyl)methane.

The poly(N-glycidyl) compounds also include, however, triglycidyl isocyanurate, N,N'-diglycidyl derivatives of cycloalkyleneureas, such as ethyleneurea or 1,3-propyleneurea, and diglycidyl derivatives of hydantoins, such as of 5,5-dimethylhydantoin.

IV) Poly(S-glycidyl) compounds, for example di-S-glycidyl derivatives, derived from dithiols, e.g. ethane-1,2-dithiol or bis(4-mercaptomethylphenyl)ether.

V) Cycloaliphatic epoxy resins, e.g. bis(2,3-epoxycyclopentyl)ether, 2,3-epoxycyclopentylglycidyl ether, 1,2-bis(2,3-epoxycyclopentyloxy) ethane or 3,4-epoxycyclohexylmethyl-3',4'-epoxycyclohexanecarboxylate.

It is also possible, however, to use epoxy resins wherein the 1,2-epoxy groups are bonded to different hetero atoms or functional groups; such compounds include, for example, the N,N,O-triglycidyl derivative of 4-aminophenol, the glycidyl ether glycidyl ester of salicylic acid, N-glycidyl-N'-(2-glycidyloxypropyl)-5,5-dimethylhydantoin and 2-glycidyloxy-1,3-bis(5,5-dimethyl-1-glycidylhydantoin-3-yl)propane.

The compositions according to the invention are resin systems of moderate to relatively high viscosity that can be fully cured by heat. In the cured state they are thermosetting materials of relatively high rigidity having a glass transition temperature of about from 80 to 140° C. The term "cycloaliphatic epoxy resin" in the context of this invention denotes any epoxy resin having cycloaliphatic structural units, that is to say it includes both cycloaliphatic glycidyl compounds and β-methylglycidyl compounds as well as epoxy resins based on cycloalkylene oxides. "Liquid at room temperature (RT)" is to be understood as meaning pourable compounds that are liquid at 25° C., i.e. are of low to medium viscosity (viscosity less than about 20000 mPa·s determined with a Rheomat equipment, type 115; MS DIN 125; D=11/s at 25° C.).

Suitable cycloaliphatic glycidyl compounds and β-methylglycidyl compounds are the glycidyl esters and β-methylglycidyl esters of cycloaliphatic polycarboxylic acids, such as tetrahydrophthalic acid, 4-methyltetrahydrophthalic acid, hexahydrophthalic acid, 3-methylhexahydrophthalic acid and 4-methylhexahydrophthalic acid.

Further suitable cycloaliphatic epoxy resins are the diglycidyl ethers and β-methylglycidyl ethers of cycloaliphatic alcohols, such as 1,2-dihydroxycyclohexane, 1,3-dihydroxycyclohexane and 1,4-dihydroxycyclohexane, 1,4-cyclohexanedimethanol, 1,1-bis(hydroxymethyl) cyclohex-3-ene, bis(4-hydroxycyclohexyl)methane, 2,2-bis(4-hydroxycyclohexyl)propane and bis(4-hydroxycyclohexyl)sulfone.

Examples of epoxy resins having cycloalkylene oxide structures are bis(2,3-epoxycyclopentyl)ether, 2,3-epoxycyclopentylglycidyl ether, 1,2-bis(2,3-epoxycyclopentyl)ethane, vinyl cyclohexene dioxide, 3,4-epoxycyclohexylmethyl 3',4'-epoxycyclohexanecarboxylate, 3,4-epoxy-6-methylcyclohexylmethyl-3',4'-epoxy-6'-methylcyclohexanecarboxylate, bis(3,4-epoxycyclohexylmethyl)adipate and bis(3,4-epoxy-6-methylcyclohexylmethyl)adipate.

Preferred cycloaliphatic epoxy resins are bis(4-hydroxycyclohexyl) methanediglycidyl ether, 2,2-bis(4-hydroxycyclohexyl)propanediglycidyl ether, tetrahydrophthalic acid diglycidyl ester, 4-methyltetrahydrophthalic acid diglycidyl ester, 4-methylhexahydrophthalic acid diglycidyl ester, 3,4-epoxycyclohexylmethyl 3',4'-epoxycyclohexanecarboxylate and especially hexahydrophthalic acid diglycidyl ester.

Aliphatic epoxy resins can also be used. As "aliphatic epoxy resins" it is possible to use epoxidation products of unsaturated fatty acid esters. It is preferable to use epoxy-containing compounds derived from mono-and poly-fatty acids having from 12 to 22 carbon atoms and an iodine number of from 30 to 400, for example lauroleic acid, myristoleic acid, palmitoleic acid, oleic acid, gadoleic acid, erucic acid, ricinoleic acid, linoleic acid, linolenic acid, elaidic acid, licanic acid, arachidonic acid and clupanodonic acid.

For example, suitable are the epoxidation products of soybean oil, linseed oil, perilla oil, tong oil, oiticica oil, safflower oil, poppyseed oil, hemp oil, cottonseed oil, sunflower oil, rapeseed oil, polyunsaturated triglycerides, triglycerides from euphorbia plants, groundnut oil, olive oil, olive kernel oil, almond oil, kapok oil, hazelnut oil, apricot kernel oil, beechnut oil, lupin oil, maize oil, sesame oil, grapeseed oil, lallemantia oil, castor oil, herring oil, sardine oil, menhaden oil, whale oil, tall oil and derivatives thereof.

Also suitable are higher unsaturated derivatives that can be obtained by subsequent dehydrogenation reactions of those oils.

The olefinic double bonds of the unsaturated fatty acid radicals of the above-mentioned compounds can be epoxidised in accordance with known methods, for example by reaction with hydrogen peroxide, optionally in the presence of a catalyst, an alkyl hydroperoxide or a peracid, for example performic acid or peracetic acid. Within the scope of the invention, both the fully epoxidised oils and the partially epoxidised derivatives that still contain free double bonds can be used for component (a).

Preference is given to the use of epoxidised soybean oil and epoxidised linseed oil.

Mixtures of epoxy resins I) to V) mentioned above can also be used. The curable composition according to the present invention preferably comprises an at 25° C. liquid or solid aromatic or cycloaliphatic glycidylether or glycidylester, especially preferably the diglycidylether or diglycidylester of bisphenol A or bisphenol F. Preferred epoxy resins can also be obtained by the reaction of polyglycidylether and polyglycidylester with alcohols, such as dials. The reaction with dials increases the molecular weight.

Especially preferred is an epoxy resin which is a bisphenol A glycidylether which is reacted with less than an equimolar amount of bisphenol A.

According to a preferred embodiment the curable composition comprises an epoxy resin selected from the group consisting of polyglycidylester, poly(β-methylglycidyl)ester, polyglycidylether, poly(β-methylglycidyl)ether and mixtures thereof.

Preferably, the curable composition according to the present invention comprises a cycloaliphatic epoxy resin which is preferably selected from the group consisting of bis(4-hydroxycyclohexyl)methanediglycidyl ether, 2,2-bis(4-hydroxycyclohexyl)propanediglycidyl ether, tetrahydrophthalic acid diglycidyl ester, 4-methyltetrahydrophthalic acid diglycidyl ester, 4-methylhexahydrophthalic acid diglycidyl ester, 3,4-epoxycyclohexylmethyl-3',4'-epoxycyclohexanecarboxylate, and hexahydrophthalic acid diglycidyl ester.

Preferably, the curable composition additionally comprises a hardener, more preferably an anhydride hardener.

More preferably the composition additionally comprises an anhydride of a polycarboxylic acid.

Anhydride hardener may be linear aliphatic polymeric anhydrides, for example polysebacic polyanhydride or polyazelaic polyanhydride, or cyclic carboxylic anhydrides.

Cyclic carboxylic anhydrides are especially preferred. Examples of cyclic carboxylic anhydrides are:

succinic anhydride, citraconic anhydride, itaconic anhydride, alkenyl-substituted succinic anhydrides, dodecenylsuccinic anhydride, maleic anhydride and tricarballylic anhydride, a maleic anhydride adduct with cyclopentadiene or methylcyclopentadiene, a linoleic acid adduct with maleic anhydride, alkylated endoalkylenetetrahydrophthalic anhydrides, methyltetrahydrophthalic anhydride and tetrahydrophthalic anhydride, the isomeric mixtures of the two latter compounds being especially suitable.

Preferably, the hardener is an anhydride hardener which is more preferably selected from the group consisting of methyltetrahydrophtalic anhydride; methyl-4-endo-methylene tetrahydrophhtalic anhydride; methylhexahydrophthalic anhydride; tetra-hydrophthalic anhydride.

More preferably the anhydride hardener is a polyester anhydride which is obtainable by the reaction of a dianhydride with a less equimolar amount of diols.

Especially preferred is the reaction product of methyltetrahydrophtalic anhydride with polyethyleneglycol which is commercially available under the name XB 5993 ex Huntsman, Switzerland.

The compositions according to the invention optionally comprise a curing accelerator as additional component. Suitable accelerators are known to the person skilled in the art. Examples that may be mentioned are:

complexes of amines, especially tertiary amines, with boron trichloride or boron trifluoride;

tertiary amines, such as benzyldimethylamine;

urea derivatives, such as N-4-chlorophenyl-N',N'-dimethylurea (monuron); unsubstituted or substituted imidazoles, such as imidazole or 2-phenylimidazole.

Preferred accelerators are tertiary amines, especially benzyldimethylamine, and imidazoles (e.g. 1-methylimidazole) for the above-mentioned compositions that comprise epoxidised oils.

The curing agents and, where applicable, accelerators are used in the customary effective amounts, that is to say amounts sufficient for curing the compositions according to the invention. The ratio of the components resin system/hardener/accelerator depends upon the nature of the compounds used, the rate of curing required and the properties desired in the end product and can readily be determined by the person skilled in the art.

Generally, from 0.4 to 1.6 equivalents, preferably from 0.8 to 1.2 equivalents, of anhydride groups per epoxy equivalent are used.

The curing accelerators are usually used in amounts of from 0.1 to 20 parts by weight per 100 parts by weight of epoxy resin(s).

The curable composition according to the present invention can additionally comprise further additives, such as flexibilizer, antisettling agents, color agents, defoamer, light stabilizer, mold release agents, toughening agents, adhesion promoter, flame retardants, and curing accelerators.

The curable composition according to the present invention can be used for the manufacture of components or parts of electrical equipment.

Therefore, a further embodiment of the present invention is the use of the curable composition according to the present invention for the manufacture of components or parts of electrical equipment. Preferably, the electrical component is selected from the group consisting of transformers, bushings, insulators, switches, sensors, converters, and cable end seals. Preferably, the curable composition is used for the direct overmolding of a vacuum chamber of a switch gear.

The curable compositions according to the present invention are preferably heat cured. The cured products obtained demonstrate surprisingly excellent mechanical properties, in particular in terms of thermal cycle crack resistance.

Therefore, a further embodiment of the present invention is a cured product which is obtainable by curing a curable composition according to the present invention.

The cured products according to the present invention are preferably used as electrically insulating construction material for electrical or electronic components, more preferably for vacuum chambers of switch gears.

A further embodiment of the present invention is a method for the manufacturing of electrical insulation equipment comprising the steps:
a) applying a curable composition according to the present invention to the housing of electrical components; and
b) curing the curable composition.

A preferred embodiment of the present invention is a method for the manufacturing of an electrical insulation for a switch gear comprising the steps:
a) applying a curable composition according to the present invention to a ceramic housing of a switch gear; and
b) curing the curable composition.

The curable composition according to the present invention is preferably used for the direct overmolding of a ceramic housing of a vacuum chamber of a switch gear. Therefore, according to a preferred embodiment of the method according to the present invention the curable composition is directly applied to the ceramic housing of the switch gear. Within the meaning of the present application directly applying means that the curable composition is applied directly on the ceramic surface without being separated by a flexible buffer layer.

According to a preferred embodiment of the method according to the present invention the curable composition according to the present invention is applied to, preferably injected into, a preheated form which contains the ceramic housing of the switch gear.

The preheated form preferably has a temperature ranging from 130 to 160° C. It is further preferred that the curable composition is heat cured, preferably at a temperature ranging from 130 to 160° C. In general, the curable composition is cured for at least 10 minutes, preferably 10 to 60 minutes.

The method according to the present invention preferably comprises the steps a) injecting the curable composition into a preheated form having a temperature ranging from 130 to 160° C. and wherein said form contains a ceramic housing of a switch gear
b) at least partly curing the curable composition
c) removing the form and
d) optionally post curing the curable composition.

It is particularly preferred that the curable composition is in direct contact with the surface of the ceramic housing of the switch gear.

EXAMPLES

TABLE 1

Raw materials used in the Examples

| | |
|---|---|
| XB 5992 ® | Liquid, modified, low viscous Bisphenol A epoxy resin with an Epoxy equivalent of 4.9-5.1 eq/kg. Supplier: Huntsman, Switzerland |
| XB 5993 ® | Liquid, modified, pre-accelerated anhydride curing agent. Supplier: Huntsman, Switzerland |
| Bayferrox ® 225 | Iron oxide pigment colour agent. Supplier: Bayer, Germany |
| Tecosil ® 44i | Fused silica with an average particle size ($d_{50}$) of 10.5 micron. Supplier: CE Minerals, Greeneville, TN, USA |
| Amosil ® 520 | AMOSIL ® 520 is produced from natural amorphous silica by grinding with subsequent air separation. Average particle size ($d_{50}$): 21 micron. Supplier: Quarzwerke, Germany |
| Tremin ® 283-100 EST | Epoxysilane-surfacetreated wollastonite with an average particle size ($d_{50}$) of 8 micron. Supplier: Quarzwerke, Germany |
| Tremin ® 283-600 EST | Epoxysilane-surfacetreated wollastonite with an average particle size ($d_{50}$) of 3.5 micron. Supplier: Quarzwerke, Germany |

1. Comparative Example C1 (fused silica Tecosil® 44i only)

In a heatable steel vessel 100 g of XB 5992® are mixed with 90 g of XB 5993® and the mixture is heated while slightly stirring with a propeller stirrer to about 60° C. for about 5 minutes. Then the mixer is stopped and 2 g of Bayferrox® 225 is added and the mixer is started again for about 1 min. Subsequently, while stirring, 342 g of Tecosil® 44i is added in portions and the mixture is heated up to 60° C. under stirring for about 10 minutes, Then the mixer is stopped and the vessel is degassed carefully by applying a vacuum for about 1 minute.

A small part of the mixture is used to measure the viscosity at 60° C. with a Rheomat equipment (type 115, MS DIN 125 D=11/s). The main part of the mixture is poured into a 140° C. hot steel mold to prepare plates for the determination of the properties (4 mm thickness). The mold is then put to an oven for 30 minutes at 140° C. After thermally curing the mold, the mold is taken out of the oven and the plates are cooled down to ambient temperature (25° C.).

2. Comparative Example C2 (Wollastonite: Tremin® 283-100 EST only)

In a heatable steel vessel 100 g of XB 5992® are mixed with 90 g of XB 5993® and the mixture is heated while slightly stirring with a propeller stirrer to about 60° C. for about 5 minutes. Then the mixer is stopped and 2 g of Bayferrox® 225 is added and the mixer is started again for about 1 min. Subsequently, while stirring, 342 g of Tremin® 283-100 EST is added in portions and the mixture is heated up to 60° C. under stirring for about 10 minutes. Then the mixer is stopped and the vessel is degassed carefully by applying a vacuum for about 1 minute. A small part of the mixture is used to measure the viscosity at 60° C. with a Rheomat equipment (type 115, MS DIN 125 D=11/s).

The main part of the mixture is poured into a 140° C. hot steel mold to prepare plates for the determination of the properties (4 mm thickness), The mold is then put to an oven for 30 minutes at 140° C. After thermally curing the mold, the mold is taken out of the oven and the plates are cooled down to ambient temperature (25° C.).

3. Example 1 According to the Invention (50% Tecosil® 44i+50% Tremin® 283-100 EST)

In a heatable steel vessel 100 g of XB 5992® are mixed with 90 g of XB 5993® and the mixture is heated while slightly stirring with a propeller stirrer to about 60° C. for about 5 minutes. Then the mixer is stopped and 2 g of Bayferrox® 225 is added and the mixer is started again for about 1 min. Subsequently, while stirring, 171 g of Tremin® 283-100 EST and 171 g of Tecosil® 44i are added in portions and the mixture is heated up to 60° C. under stirring for about 10 minutes. Then the mixer is stopped and the vessel is degassed carefully by applying a vacuum for about 1 minute.

A small part of the mixture is used to measure the viscosity at 60° C. with a Rheomat equipment (type 115, MS DIN 125 D=11/s).

The main part of the mixture is poured into a 140° C. hot steel mold to prepare plates for the determination of the properties (4 mm thickness). The mold is then put to an oven for 30 minutes at 140° C. After thermally curing the mold, the mold is taken out of the oven and the plates are cooled down to ambient temperature (25° C.).

4. Comparative Example C3 (naturally amorphous silica Amosil® 520 only)

In a heatable steel vessel 100 g of XB 5992® are mixed with 90 g of XB 5993® and the mixture is heated while slightly stirring with a propeller stirrer to about 60° C. for about 5 minutes. Then the mixer is stopped and 2 g of Bayferrox® 225 is added and the mixer is started again for about 1 min. After that, while stirring, 342 g of Amosil® 520 is added in portions and the mixture is heated up to 60° C. under stirring for about 10 minutes. Then the mixer is stopped and the vessel is degassed carefully by applying a vacuum for about 1 minute.

A small part of the mixture is used to measure the viscosity at 60° C. with a Rheomat equipment (type 115, MS DIN 125 D=11/s).

The main part of the mixture is poured into a 140° C. hot steel mold to prepare plates for the determination of the properties (4 mm thickness). The mold is then put to an oven for 30 minutes at 140° C. After thermally curing the mold, the mold is taken out of the oven and the plates are cooled down to ambient temperature (25° C.).

5. Comparative Example C4 (Wollastonite: Tremin® 283-600 EST only)

In a heatable steel vessel 100 g of XB 5992® are mixed with 90 g of XB 5993® and the mixture is heated while slightly stirring with a propeller stirrer to about 60° C. for about 5 minutes. Then the mixer is stopped and 2 g of Bayferrox® 225 is added and the mixer is started again for about 1 min. Subsequently, while stirring, 342 g of Tremin® 283-

600 EST is added in portions and the mixture is heated up to 60° C. under stirring for about 10 minutes. Then the mixer is stopped and the vessel is degassed carefully by applying a vacuum for about 1 minute.

A small part of the mixture is used to measure the viscosity at 60° C. with a Rheomat equipment (type 115, MS DIN 125 D=11/s).

The main part of the mixture is poured into a 140° C. hot steel mold to prepare plates for the determination of the properties (4 mm thickness). The mold is then put to an oven for 30 minutes at 140° C. After thermally curing the mold, the mold is taken out of the oven and the plates are cooled down to ambient temperature (25° C.).

6. Example 2 According to the Invention (85% Amosil+15% Tremin® 283-600 EST)

In a heatable steel vessel 100 g of XB 5992® are mixed with 90 g of XB 5993® and the mixture is heated while slightly stirring with a propeller stirrer to about 60° C. for about 5 minutes. Then the mixer is stopped and 2 g of Bayferrox® 225 is added and the mixer is started again for about 1 min. Subsequently, while stirring, 51.3 g of Tremin® 283-600 EST and 290.7 g of Amosil® 520 are added in portions and the mixture is heated up to 60° C. under stirring for about 10 minutes. Then the mixer is stopped and the vessel is degassed carefully by applying a vacuum for about 1 minute.

A small part of the mixture is used to measure the viscosity at 60° C. with a Rheomat equipment (type 115, MS DIN 125 D=11/s).

The main part of the mixture is poured into a 140° C. hot steel mold to prepare plates for the determination of the properties (4 mm thickness). The mold is then put to an oven for 30 minutes at 140° C. After thermally curing the mold, the mold is taken out of the oven and the plates are cooled down to ambient temperature (25° C.).

The amounts referred to in the tables which follow are given in parts per weight.

All test species were conditioned at 23° C. and a relative humidity of 50% for 48 hours.

TABLE 2

| Components | | Comparative Example C1 | Comparative Example C2 | Example 1 (according to the Invention) | Average (C1; C2) | Effect beyond average |
|---|---|---|---|---|---|---|
| XB 5992 ® | | 100 | 100 | 100 | | |
| XB 5993 ® | | 90 | 90 | 90 | | |
| Bayferrox ® 225 | | 2 | 2 | 2 | | |
| Quarzgutmehl CE (Tecosil ® 44i) | | 342 | — | 171 | | |
| Wollastonit Tremin ® 283-100 EST | | — | 342 | 171 | | |
| Viscosity at 60° C.[1] | Pa s | 29.0 | 28.5 | 20.0 | 28.8 | 30% |
| Tensile strength[2] | MPa | 83 | 84 | 90 | 83.5 | 8% |
| Elongation at break[3] | % | 1.0 | 0.9 | 1.1 | 1.0 | 16% |
| Flexural Strength[4] | MPa | 114 | 120 | 135 | 117.0 | 15% |
| Strain of out fiber[5] | % | 1.1 | 1.2 | 1.2 | 1.2 | 4% |
| $K_{1c}$[6] | MPa/m$^2$ | 2.0 | 2.7 | 2.7 | 2.4 | 15% |
| $G_{1c}$[7] | J/m$^2$ | 298 | 565 | 475 | 431.5 | 10% |
| CTE (below Tg)[8] | ppm/K | 29.9 | 31.7 | 28.6 | 30.8 | |
| Tg (1$^{st}$ run)[9] | ° C. | 104 | 100 | 98 | 102.0 | |
| RI = f (Tg, CTE, G1C, elongation)[10] | ° C. | −50 | −65 | −97 | −60 | 62% |

TABLE 3

| | | Comparative Example C3 | Comparative Example C4 | Example 2 according to the Invention | Expectation 3-4 | Effect beyond expectation |
|---|---|---|---|---|---|---|
| XB 5992 ® | | 100 | 100 | 100 | | |
| XB 6993 ® | | 90 | 90 | 90 | | |
| Bayferrox ® 225 | | 2 | 2 | 2 | | |
| Amosil ® 520 | | 342 | — | 290.7 | | |
| Wollastonit Tremin ® 283-600 EST | | — | 342 | 51.3 | | |
| Viscosity at 60° C.[1] | Pa s | 7.6 | too high | 8.6 | 10.0 | 14% |
| Tensile strenght[2] | MPa | 80 | n.m | 86 | 80.0 | 8% |
| Elongation at break[3] | % | 0.9 | n.m | 1.1 | 0.9 | 22% |
| Flexural Strength[4] | MPa | 108 | n.m | 128 | 108.0 | 19% |
| Strain of out fiber[5] | % | 1.0 | n.m | 1.1 | 1.0 | 10% |
| $K_{1c}$[6] | MPa/m$^2$ | 2.1 | n.m | 2.4 | 2.2 | 9% |
| $G_{1c}$[7] | J/m$^2$ | 335 | n.m | 441 | 335.0 | 32% |
| CTE (below Tg)[8] | ppm/K | 27.5 | n.m | 25.7 | 27.5 | |
| Tg (1$^{st}$ run)[9] | ° C. | 102 | n.m | 105 | 102.0 | |

TABLE 3-continued

|  |  | Comparative Example C3 | Comparative Example C4 | Example 2 according to the Invention | Expectation 3-4 | Effect beyond expectation |
|---|---|---|---|---|---|---|
| RI = f (Tg, CTE, G1C, elongation)[10] | °C. | −76 |  | −131 | −76 | 71% | n.m.: not measured
[1] determined at 60° C. with a Rheomat equipment (type 115, MS DIN 125; D = 11/s)
[2] according to ISO 527-1 (1993), test specimen type B (190 × 20.5 × 4 mm); testing speed: 1.00 mm/min
[3] according to ISO 527-1 (1993), test specimen type B (190 × 20.5 × 4 mm); testing speed: 1.00 mm/min
[4] determined according to ISO 178, dimension of test specimen: 80 × 10 × 4 mm; testing speed: 2.00 mm/min
[5] determined according to ISO 178, dimension of test specimen: 80 × 10 × 4 mm; testing speed: 2.00 mm/min
[6,7] fracture toughness expressed in $K_{1C}$ and $G_{1C}$ values, determined according to PM 216, dimension of test species: 80 × 34 × 4 mm; testing speed: 0.50 mm/min
[8] CTE = Coefficient of thermal expansion determined according to ISO 11359-2: 1999, range: 20 to 60° C.
[9] determined according to ISO 11359-2: 1999, 10-20 mg; temperature change: 10.0 K/min, dimension of fast species: 50 × 4 × 4 mm; temperature change: 2 K/min
[10] RI = crack index The crack index given in Table 2 and 3 is a function of different mechanical parameters, all of which are able to influence the cracking behaviour in the event of stress caused by changes in temperature, combined to form a single variable, the so-called crack index. The crack index enables an objective comparison of the mechanical qualities of different systems to be made more easily.

The following qualitative statements, relating to the effects of changes in individual parameters on the temperature variation behaviour, can be derived empirically:
1. The higher the $T_g$ value, the poorer is the temperature variation behaviour.
2. The lower the $G_{IC}$ value, the poorer is the temperature variation behaviour.
3. The lower the elongation value, the poorer is the temperature variation behaviour,
4. The higher the expansion coefficient (CTE), the poorer is the temperature variation behaviour.

However, when several parameters are changed simultaneously it is no longer possible to make qualitative statements about the resulting temperature variation behaviour. When, for example, both the $T_g$ value and the $G_{IC}$ value rise but the CTE value decreases, it is no longer possible to make predictions as to the temperature variation behaviour that is to be expected.

At Ciba Spezialitättenchemie, statistical evaluations of measurement values using a large number of extremely varied systems have led to a formula for calculating a new variable, the so-called crack index, which formula is extremely helpful from the standpoint of application technology. Using this variable it is now possible, even in the event of multiple changes, to make statements relating to the resultant temperature variation behaviour to be expected.

The formula is as follows:

$$RI = -498.08 \cdot Z^{0.18480890} \cdot G^{0.194114601} \cdot (A-18)^{-0.391334273} \cdot T^{-0.158387791} + 224.25$$

where: RI=crack index; Z=tensile elongation in %; G=$G_{IC}$ in J/m²;
A=expansion coefficient in ppm/K and T=$T_g$ in ° C.

Using that formula, a decrease in the crack index value indicates an improvement in the resistance to temperature variation that is to be expected. The crack index correlates very well with the average cracking temperature in ° C., which can be determined in a practical cracking test. That cracking temperature and thus also the crack index provide an indication of the temperature beyond which cracks are likely to form (caused by stress in the event of temperature fluctuations and differences in the expansion coefficients of potting compound and metal insert).

Discussion of Results

Tab.2 Comparison of Comparative Example C1 and C2 with Example 1 According to the Invention:
a) Viscosity Aspects Compositions with either only filler Tecosil® 44i (in order to obtain low CTE) or only Wollastonite Tremin® 283-100 EST (in order to obtain good toughness=high $K_{IC}$ and $G_{IC}$) are not a suitable solution for the problem to be solved, since both system (comparative example C1 and C2) demonstrate viscosities which are too high. From a 1:1 mixture of C1 and C2 it could in principle be expected that the values given in the column "average (C1; C2) are obtained. It is obvious, that also the expected viscosity of the mixture would be too high for the object of the invention (the provision of a casting system for direct over molding of vacuum switch gears). It was therefore unexpected to find that the viscosity of Example 1 (which is in principle a 1:1 mixture of C1 and C2) is much lower and therefore applicable for the desired application.
b) Mechanical Aspects The tensile strength of C1 and C2 are nearly the same and this would also be expected for the mixture. However, example 1 even leads to a tensile strength 8% higher than that expected when calculating the average.

The behaviour of the flexural strength is in line with this observation and 15% higher than that what would be expected.

Comparative example C2, the system with wollastonite.

Due to the needle shaped filler high values for $K_{IC}$ and $G_{IC}$ are expected. However, the high toughness observed is yet insufficient to lead to a very low overall crack index "RI". Comparative example C2 leads only to a crack index "RI" of −65° C. Practical experiences showed that a value of around −100° C. is usually necessary to withstand the stresses that occur in direct over molded vacuum switch gears. Thus, C2 would not be suitable for direct over molding of a vacuum switch gear.

Comparative example C1 is the system which contains only fused silica. The value far the CTE is lower than in C2 but the values for $K_{IC}$ and $G_{IC}$ are lower than for the composition according to Comparative Example C2 comprising wollastonite. Taking all factors into account C1 only leads to a crack temperature of −50° C., which is much too high for direct over molding of vacuum switch gears.

It has surprisingly found that the 1:1 combination of C1 and C2 does not lead to an average $K_{IC}$ as expected, but to much higher values. Surprisingly, it has been found that the curable composition as defined in Example 1 leads to a crack temperature of −97° C., which is sufficient for direct over molding of vacuum switch gears. This low crack temperature is 62% better (=lower) than the temperature calculated based on the average mechanical values for the mix of both formulations.

Tab.3 Comparison of Comparative Examples C3 and C4 with Example 2 of the Invention:

a) Viscosity Aspects

The composition according to comparative example C3 comprises only natural amorphous silica as filler. The viscosity determined is sufficiently low for the direct overmolding of switch gears.

The composition according to comparative example C4 comprises only the filler wollastonite. The viscosity of said composition is too high and, as a consequence, it was impossible to measure the viscosity. The high viscosity renders the composition according to C4 not suitable for direct overmolding applications.

As this type of wollastonite dramatically increases the viscosity, it was surprisingly found that the replacement of 15 wt.-% of the silica by wollastonite had only a slight effect on the viscosity.

b) Mechanical Aspects:

The composition of comparative example C3 leads to similar mechanical properties as the composition according to C1. The crack temperature RI determined for the cured composition according to C3 leads to −76° C. which is still too high for the desired application.

The composition according to comparative example C4 has a viscosity which is too high to make test plates and to measure the mechanical properties.

The composition of example 2 comprises only a small portion of wollastonite compared to silica (15:85) in order to test more extreme conditions.

No data are available for the formulation containing only the Tremin® 283-600 EST type wollastonite, as it was impossible to cast test specimens due to the high viscosity. Therefore, only a guess of improvements to be expected, when combining both fillers is mentioned in Table 3, could be made. It was expected that a minor addition of only 15% wollastonite should not have a dramatic effect. However, it turned out that the mechanical performance increased significantly. Virtually all properties were much better than that of the composition comprising only the filler Amosil 520 (C3). The crack temperature decreased to −131° C., which is 71% better than obtained with the sole filler Amosil 520. Due to the low viscosity the formulation according to example 2 is suitable for direct overmolding of vacuum switch gears.

What is claimed is:

1. Curable composition comprising
   a) an epoxy resin
   b) a filler composition comprising
      i) wollastonite having an average particle size ($d_{50}$) from 2 to 50 µm and
      ii) amorphous silica and
   c) a polyester anhydride hardener obtained from the reaction of a dianhydride and a less equimoloar amount of a diol comprising polyethylene glycol
   wherein at least one of the fillers of the filler composition is surface treated with a silane and the weight ratio of amorphous silica to wollastonite is from 10:1 to 1:10.

2. Curable composition according to claim 1 wherein the amorphous silica has an average particle size ($d_{50}$) ranging from 2 to 50 µm.

3. Curable composition according to claim 1 wherein the wollastonite and/or the amorphous silica is surface treated with a silane selected from the group consisting of aminosilane, epoxysilane, (meth)acrylic silane, methylsilane and vinylsilane.

4. Curable composition according to claim 1 wherein the amorphous silica is natural amorphous silica or fused silica.

5. A cured product obtained by curing the curable composition as defined in claim 1.

6. Method for the manufacturing of a component of electrical insulation equipment comprising the steps:
   a) applying a curable composition as defined in claim 1 to the housing of the electrical component; and
   b) curing the curable composition.

7. Method according to claim 6 wherein the electrical component is selected from the group consisting of a transformer, a bushing, an insulator, a switch, a sensor, a converter and a cable end seal.

8. Method according to claim 6 wherein the electrical component is a switch gear.

9. Method according to claim 8 wherein the curable composition is directly applied to a ceramic housing of a vacuum chamber of the switch gear.

* * * * *